US008841011B2

(12) United States Patent
Jang

(10) Patent No.: US 8,841,011 B2
(45) Date of Patent: Sep. 23, 2014

(54) SECONDARY BATTERY

(75) Inventor: Youngcheol Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 241 days.

(21) Appl. No.: 13/186,283

(22) Filed: Jul. 19, 2011

(65) Prior Publication Data

US 2012/0021256 A1   Jan. 26, 2012

Related U.S. Application Data

(60) Provisional application No. 61/367,555, filed on Jul. 26, 2010.

(51) Int. Cl.
| | |
|---|---|
| *H01M 14/00* | (2006.01) |
| *H01M 10/50* | (2006.01) |
| *H01M 6/46* | (2006.01) |
| *H01M 2/06* | (2006.01) |
| *H02H 5/04* | (2006.01) |
| *H01M 2/10* | (2006.01) |
| *H01M 10/637* | (2014.01) |
| *H01M 2/30* | (2006.01) |
| *H01M 2/34* | (2006.01) |
| *H01M 10/42* | (2006.01) |

(52) U.S. Cl.
CPC .......... *H01M 10/425* (2013.01); *H01M 2/1066* (2013.01); *H01M 10/5026* (2013.01); *H01M 2/30* (2013.01); H01M 2200/10 (2013.01); Y02E 60/12 (2013.01); *H01M 2/348* (2013.01)
USPC ................. 429/7; 429/62; 429/162; 429/175; 429/178; 361/103

(58) Field of Classification Search
USPC ................. 429/7, 61–63, 161–165, 175, 178; 361/103
See application file for complete search history.

(56) References Cited

U.S. PATENT DOCUMENTS

| | | | |
|---|---|---|---|
| 2003/0157399 A1 | 8/2003 | Ikeuchi et al. | |
| 2006/0251930 A1 | 11/2006 | Kim | |
| 2009/0146614 A1* | 6/2009 | Carrier et al. ................. | 320/152 |
| 2009/0263711 A1* | 10/2009 | Kim et al. ..................... | 429/164 |
| 2010/0075205 A1 | 3/2010 | Kwag et al. | |

(Continued)

FOREIGN PATENT DOCUMENTS

| | | |
|---|---|---|
| CN | 201233945 Y | 5/2009 |
| JP | 2003-077441 A | 3/2003 |

(Continued)

OTHER PUBLICATIONS

EPO Search Report dated Mar. 4, 2013, for corresponding European Patent application 11175422.2, (8 pages).

(Continued)

*Primary Examiner* — Muhammad Siddiquee
(74) *Attorney, Agent, or Firm* — Christie, Parker & Hale, LLP

(57) ABSTRACT

A secondary battery includes a bare cell having a can, a cap plate on the can, and an electrode terminal protruding from the cap plate; a protection circuit module on the bare cell, the protection circuit module including a circuit board; a temperature sensitive device coupled to the circuit board; and a first lead plate electrically coupled to the circuit board and to the electrode terminal.

15 Claims, 4 Drawing Sheets

(56) References Cited

U.S. PATENT DOCUMENTS

| | | | |
|---|---|---|---|
| 2010/0098974 A1* | 4/2010 | Kim et al. | 429/7 |
| 2010/0136408 A1 | 6/2010 | Koh et al. | |
| 2010/0143753 A1 | 6/2010 | Kim et al. | |
| 2013/0071697 A1 | 3/2013 | Kwag et al. | |

FOREIGN PATENT DOCUMENTS

| | | |
|---|---|---|
| JP | 2010-003433 | 1/2010 |
| JP | 2010-073696 A | 4/2010 |
| JP | 2010-118296 | 5/2010 |
| JP | 2010-135254 | 6/2010 |
| JP | 2010-140897 | 6/2010 |
| JP | 2010-146835 | 7/2010 |
| KR | 10-2003-0038560 A | 5/2003 |
| KR | 10-2004-0103940 A | 12/2004 |
| KR | 10-2006-0087001 A | 8/2006 |
| KR | 10-2007-0081306 A | 8/2007 |
| KR | 10-2009-0056027 A | 6/2009 |
| KR | 10-2010-0044487 A | 4/2010 |

OTHER PUBLICATIONS

JPO Office action dated May 28, 2013, for corresponding Japanese Patent application 2011-159241, (2 pages).

Patent Abstracts of Japan, and English machine translation of Japanese Publication 2010-003433 dated Jan. 7, 2010, listed above, (18 pages).

Patent Abstracts of Japan, and English machine translation of Japanese Publication 2010-118296 dated May 27, 2010, (16 pages).

Patent Abstracts of Japan, and English machine translation of Japanese Publication 2010-135254 dated Jun. 17, 2010, (13 pages).

Patent Abstracts of Japan, and English machine translation of Japanese Publication 2010-146835 dated Jul. 1, 2010, (12 pages).

Korea Office action issued in corresponding KR Application No. 10-2011-0070937, dated Oct. 24, 2012, 9 pages.

SIPO Office action dated Aug. 19, 2013, for corresponding Chinese Patent application 201110209975.1, (9 pages).

JPO Notice of Allowance, dated Oct. 15, 2013, for corresponding Japanese Patent application 2011-159241, 3 pages.

Patent Abstracts of Japan with English Machine Translation of Claims and Description of Drawings, for JP 2003-077441 A, 4 pages.

Chinese Office action dated Feb. 21, 2014 issued by the SIPO in the corresponding Chinese Patent Application No. 20110209975.1, 8 pages.

* cited by examiner

SECONDARY BATTERY

CROSS-REFERENCE TO RELATED APPLICATIONS

This application claims priority to and the benefit of Provisional Patent Application No. 61/367,555 filed in the United States Patent and Trademark Office on Jul. 26, 2010, the entire content of which is incorporated herein by reference.

FIELD

The present invention relates to a secondary battery.

DESCRIPTION OF THE RELATED ART

A secondary battery may be overcharged or overdischarged during its charging and discharging. Overcharging or overdischarging causes gas or heat to be generated from decomposition of an electrolyte and therefore may deteriorate the performance of the battery or damage the battery. As such, a protection circuit module can be provided to prevent such overcharging and overdischarging. The protection circuit module interrupts charging and discharging operations upon detection of overcharge or overdischarge of the secondary battery.

In addition, a temperature sensitive device such as a fuse device may be additionally provided to the secondary battery to prevent thermal damage to the secondary battery. The temperature sensitive device senses heat generated from a bare cell and interrupts the current if an overcurrent flows through the bare cell.

SUMMARY

Embodiments of the present invention provides a secondary battery capable of efficiently transferring heat from a battery cell to a positive temperature coefficient (temperature sensitive device) to improve stability.

In one embodiment, a secondary battery is provided including a bare cell having a can, a cap plate on the can, and an electrode terminal protruding from the cap plate; a protection circuit module on the bare cell, the protection circuit module including a circuit board; a temperature sensitive device coupled to the circuit board; and a first lead plate electrically coupled to the circuit board and to the electrode terminal.

In one embodiment, the first lead plate includes a first planar portion coupled to the circuit board; a second planar portion coupled to the electrode terminal; and a connecting portion between the first planar portion and the second planar portion. The connecting portion may be substantially perpendicular to the first planar portion and to the second planar portion and a length of the connecting portion is substantially equal to a height of the temperature sensitive device. Additionally, the circuit board may be spaced from the cap plate.

In one embodiment, the protection circuit module further includes a second lead plate coupled to the circuit board and to the cap plate and a third lead plate coupled to the circuit board and to the cap plate. The second lead plate and the third lead plate may each include a first planar portion, a second planar portion and a connecting portion between the first planar portion and the second planar portion. In one embodiment, the first planar portion of the second lead plate and the third lead plate contacts the circuit board and wherein the second planar portion of the second lead plate and the third lead plate contacts the cap plate.

Further, in one embodiment, the first lead plate is connected to the temperature sensitive device by a weld or by a thermally conductive adhesive.

In one embodiment, the protection circuit module further includes a field effect transistor on the circuit board and the field effect transistor may be spaced from the cap plate. Additionally, the cap plate may have an opening that is generally aligned with the first lead plate and the first lead plate and the electrode terminal can be welded at a region generally corresponding to the opening.

According to embodiments of a secondary battery of the present invention, since a first lead plate located at a lower part of a protection circuit module (i.e., on a side closer to the electrode assembly) and is connected to an electrode terminal of a bare cell and is coupled to a lower surface of a positive temperature coefficient (temperature sensitive device), heat is not lost during transfer from the bare cell to the temperature sensitive device and therefore the temperature sensitive device may sensitively operate according to the temperature of the bare cell. Accordingly, the operational reliability and the product stability are improved.

DETAILED DESCRIPTION

Exemplary embodiments of the present invention will now be described in detail with reference to the accompanying drawings to fully explain the present invention in such a manner that it may easily be carried out by a person with ordinary skill in the art.

Hereinafter, the structure of a secondary battery according to one embodiment of the present invention will be described.

Figure 1:
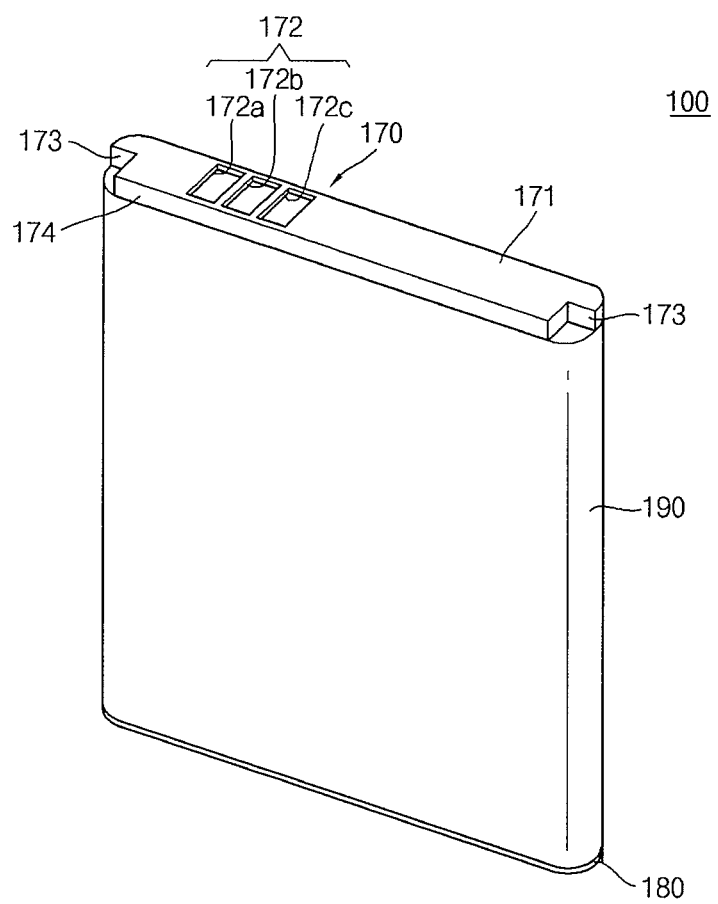
FIG. 1 is a perspective view of a secondary battery according to one embodiment of the present invention.
Figure 2:
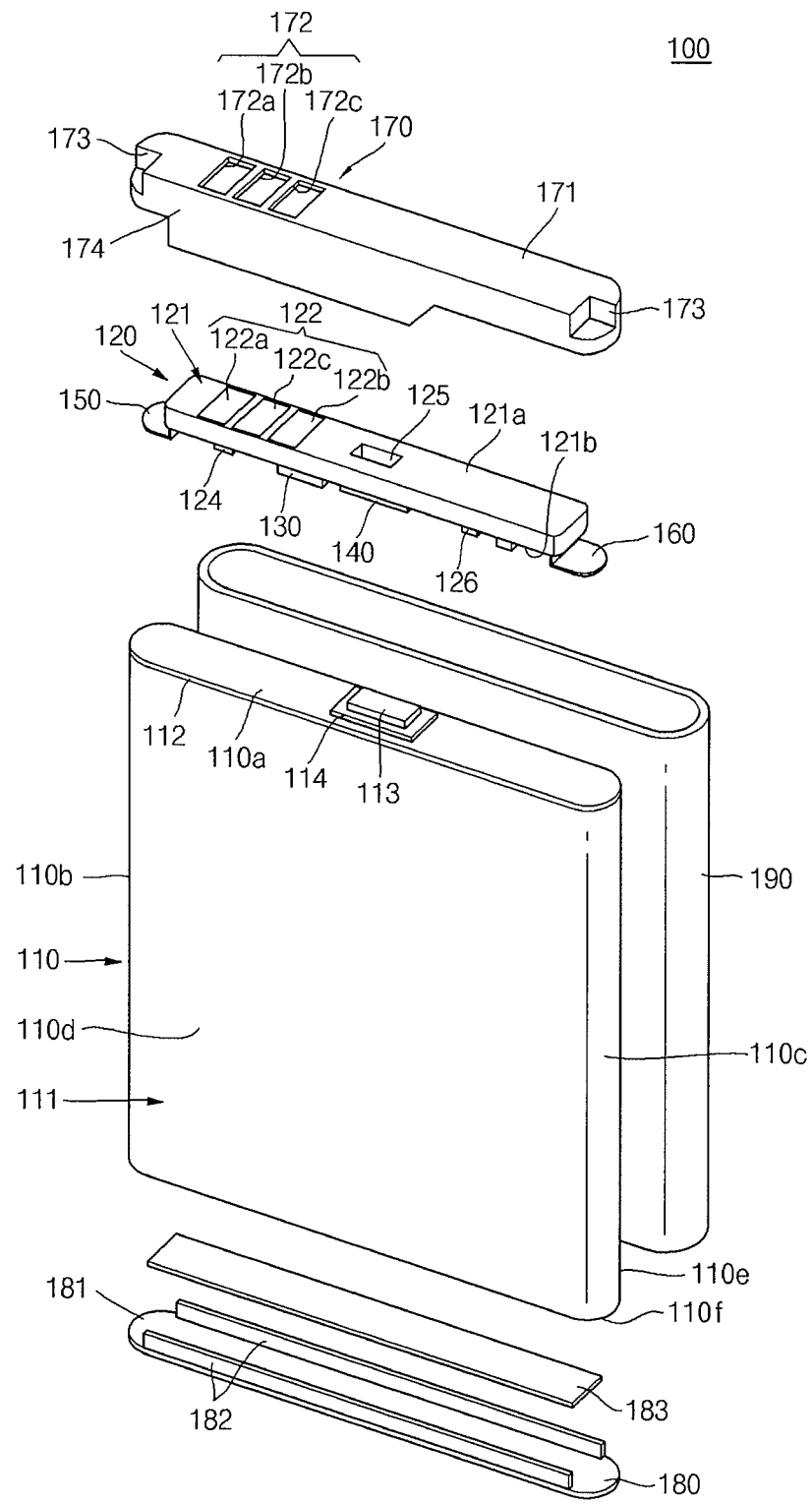
FIG. 2 is an exploded perspective view of the secondary battery.
Figure 3:
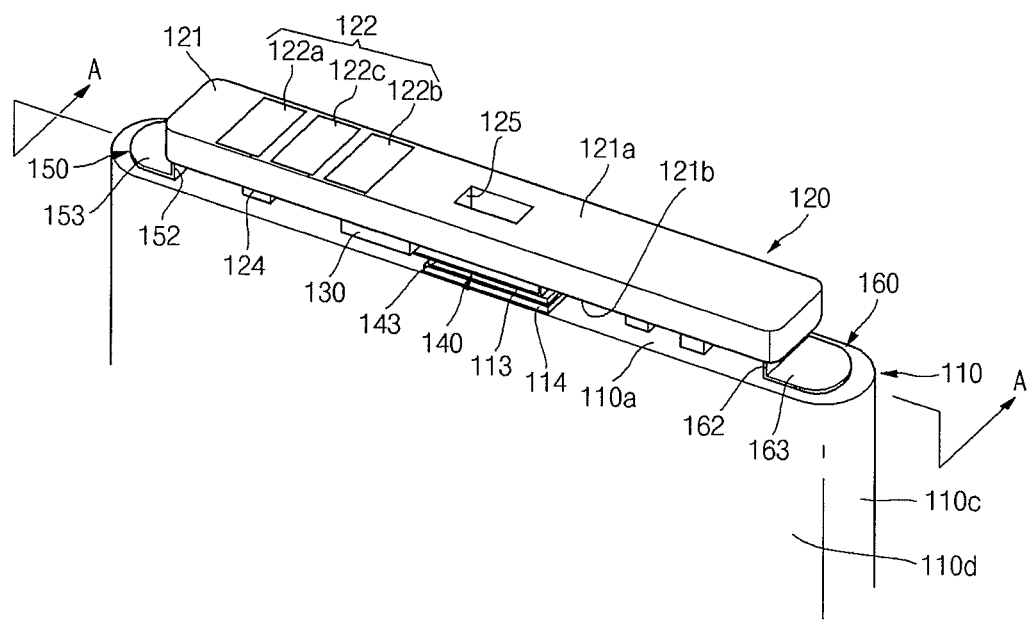
FIG. 3 is a perspective view showing a connected state of a battery cell and a protection circuit module of the secondary battery.
Figure 4:
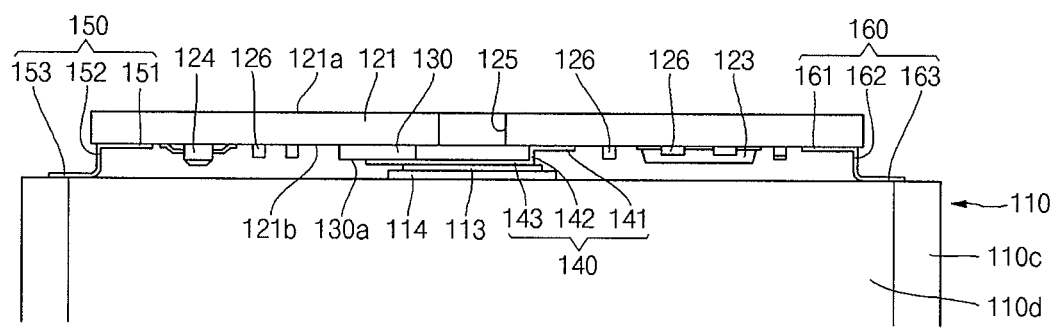
FIG. 4 is a sectional view cut along a line A-A' of FIG. 3.
Figure 5:
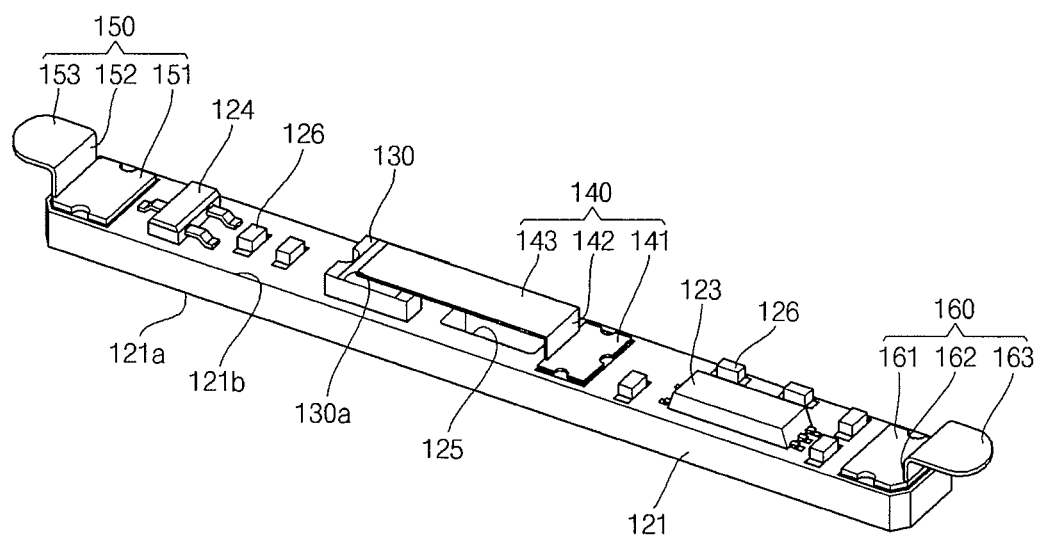
FIG. 5 is a bottom perspective view of the protection circuit module of the secondary battery.

FIG. 1 is a perspective view of a secondary battery according to one embodiment of the present invention. FIG. 2 is an exploded perspective view of the secondary battery according to the embodiment of the present invention. FIG. 3 is a perspective view showing a connected state of a battery cell and a protection circuit module of the secondary battery and FIG. 4 is a sectional view cut along a line A-A' of FIG. 3. FIG. 5 is a bottom perspective view of the protection circuit module of the secondary battery.

Referring to FIGS. 1 and 2, a secondary battery 100 according to the embodiment includes a bare cell 110, a protection circuit module 120, a first lead plate 140, a second lead plate 150, and a third lead plate 160. Additionally, the secondary battery 100 may further include an upper cover 170, a lower cover 180, and a label 190.

The bare cell 110 includes an electrode assembly being chargeable and dischargeable and having a positive electrode, a negative electrode, and a separator located between the positive and the negative electrodes, a can 111 having a container shape for housing the electrode assembly and an electrolyte, and a cap plate 112 sealing the can 111, the cap plate 112 being made of metal. An electrode terminal 113 is connected substantially in the middle of the cap plate 112. Here, an insulating gasket 114 may be located between the cap plate 112 and the electrode terminal 113 to insulate the electrode terminal 113 from the cap plate 112.

The can 111 and the cap plate 112 may function as terminals, for example, as positive electrodes. In this case, the electrode terminal 113 may function as a negative electrode. However, polarities of the cap plate 112 and the electrode terminal 113 may be reversed.

The bare cell 110 has an upper surface 110a from which the electrode terminal 113 protrudes and is electrically insulated by the gasket 114, a pair of short side surfaces 110b and 110c and a pair of long side surfaces 110d and 110e which are continuous with the upper surface 110a, and a lower surface 110f continuous with the side surfaces 110b, 110c, 110d, and 110e and oriented to face the upper surface 110a. The pair of short side surfaces 110b and 110c refer to narrow side surfaces while the pair of long side surfaces 110d and 110e refer to wide side surfaces.

With reference to FIG. 2, the protection circuit module 120 is located at an upper part of the bare cell 110 (i.e., proximate to the cap plate) and is electrically connected to the bare cell 110. The protection circuit module 120 includes a circuit board 121, a terminal 122, a circuit device 123, a field effect transistor (FET) 124, a welding hole 125, and a passive device 126.

The circuit board 121 is substantially plate-shaped and includes a protection circuit adapted to prevent overcharging and overdischarging of the bare cell 110. Here, it is noted that the circuit board 121 and the protection circuit module 120 share the same upper surface 121a and the same lower surface 121b.

The terminal 122 is formed on the upper surface 121a of the circuit board 121 to electrically connect the circuit board 121 to an external electronic device. In one embodiment, the terminal 122 may include a pack negative terminal 122a, a pack positive terminal 122b, and a temperature and identification (ID) check terminal 122c.

The circuit device 123 is located on the lower surface 121b of the circuit board 121. The circuit device 123 includes a charge and discharge circuit which performs charging and discharging with respect to the bare cell 110. In addition, the circuit device 123 includes a protection circuit which prevents the overcharging, overdischarging, and overcurrent as described above.

The FET 124 is located on the lower surface 121b of the circuit board 121 and is electrically connected to the circuit device 123 through the circuit board 121. The FET 124 forms part of the charge and discharge circuit of the circuit device 123. More specifically, the FET 124 is located on at least a part of a charging path or a discharging path of the bare cell 110 to control the charging and discharging operations. The FET 124 may be separately formed outside the circuit device 123 since the FET 124 generates heat during the operation. However, the FET 124 may also be located in the circuit device 123 depending on design of the circuit.

The welding hole 125 is located substantially in the middle of the circuit board 121. In one embodiment, the welding hole 125 is located on a region substantially corresponding to or aligned with the electrode terminal 113 of the bare cell 110, thereby creating a welding region for welding of the first lead plate 140 to the electrode terminal 113 using resistance welding or laser welding. The first lead plate 140 will be described in more detail below.

The passive device 126 may constitute part of the charge and discharge circuit or part of the protection circuit of the circuit device 123. Although illustrated as a separate structure in the drawing, the passive device 126 may also be located in the circuit device 123.

The temperature sensitive device (which may be a positive temperature coefficient) 130 is located on the lower surface 121b of the circuit board 121 and is electrically connected to a pattern of the protection circuit module 120. The temperature sensitive device 130 interrupts the current when the bare cell 110 reaches a reference temperature, thereby preventing an abnormal operation caused by excessive heat generated from the bare cell 110. In one embodiment, the temperature sensitive device 130 may be a chip temperature sensitive device thermistor capable of being surface-mounted to the circuit board 121, but is not limited thereto. For example, the temperature sensitive device 130 may have operational characteristics of a room temperature resistance of hundreds of ohms and an operation temperature of about 75 to 120° C.

A lower surface 130a of the temperature sensitive device 130 facing the bare cell 110 is electrically connected to the first lead plate 140. In other words, an end of the first lead plate 140 extends up to the lower surface 130a of the temperature sensitive device 130. The temperature sensitive device 130 may be connected to the first lead plate 140 by welding or by a heat conductive adhesive.

Since the first lead plate 140 is in direct contact with the electrode terminal 113 of the bare cell 110 and is made of metal having high heat conductivity, the heat from the bare cell 110 may be transferred to the temperature sensitive device 130 through the first lead plate 140 without significant loss. Therefore, the temperature sensitive device 130 is capable of sensitively reacting to the temperature of the bare cell 110 and effectively interrupting the current flow when the bare cell temperature reaches or exceeds the reference temperature. As a consequence, stability of the secondary battery 100 according to the embodiment may be secured.

The first lead plate 140 is located on the lower surface 121b of the circuit board 121. The first lead plate 140 is connected to the pattern of the circuit board 121 and, due to its bent configuration, further connected to the electrode terminal 113 of the bare cell 110. The end of the first lead plate 140 extends to be connected to the lower surface 130a of the temperature sensitive device 130.

The first lead plate 140 includes a first region 141 connected to the lower surface 121b of the circuit board 121, a second region 142 bent from the first region 141, and a third region 143 bent from the second region 142 and connected to the electrode terminal 113 of the bare cell 110 and the temperature sensitive device 130.

The first region 141 is connected to the lower surface 121b of the circuit board 121. In one embodiment, the first region 141 is electrically connected with the circuit pattern formed at the lower surface 121b of the circuit board 121. The first region 141 transmits to the circuit board 121 a signal applied from the electrode terminal 113 of the bare cell 110.

The second region 142 is bent from the first region 141. In one embodiment, the second region 142 is bent by an angle of about 90° toward the cap plate 112 of the bare cell 110. Further, the second region 142 has a length substantially corresponding to a thickness of the temperature sensitive device 130, thereby maintaining a height from the first region 141 to the third region 143 to correspond to the thickness of the temperature sensitive device 130. Therefore, the third region 143 connected to the second region 142 is able to horizontally extend to the lower surface 130a of the temperature sensitive device 130.

The third region 143 is bent from the second region 142. In addition, the third region 143 extends in the opposite direction to the first region 141 with respect to the second region 142, forming a generally Z-shaped structure but with 90 degree angles.

The third region 143 is in physical contact and is electrical connected to the electrode terminal 113 of the bare cell 110. The third region 143 may be welded to the electrode terminal 113 through the welding hole 125 of the protection circuit module 120. Since the third region 143 directly contacts the electrode terminal 113, heat from the bare cell 110 is efficiently transferred to the third region 143 through the electrode terminal 113.

An end of the third region 143 extends to the lower surface 130a of the temperature sensitive device 130. The third region 143 may be connected to the lower surface 130a by welding or by a heat conductive adhesive. The third region 143 transfers the heat from the electrode terminal 113 of the bare cell 110 to the temperature sensitive device 130 without significant loss. Accordingly, the temperature sensitive device 130 is capable of accurately sensing the temperature of the bare cell 110 and sensitively performing interruption of the current when the bare cell 110 reaches or exceeds the reference temperature.

The second lead plate 150 is located at one lower side of the protection circuit module 120 and is electrically connected with a terminal pattern of the protection circuit module 120. The second lead plate 150 forms an electrical connection between the bare cell 110 and the protection circuit module 120. The second lead plate 150 may be made of metal such as nickel or a nickel alloy. In one embodiment, the second lead plate 150 may be connected with the upper surface 110a of the bare cell, that is, the cap plate 113 to function as a positive electrode. The second lead plate 150 includes a first region 151 located at a lower part of the protection circuit module 120, a second region 152 bent from the first region 151, and a third region 153 bent from the second region 152 to be connected to the cap plate 113 of the bare cell 110.

The third lead plate 160 is located at the other lower side of the protection circuit module 120, corresponding to the second lead plate 150. The third lead plate 160 is oriented substantially symmetrically to the second lead plate 150 and is also electrically connected to the terminal pattern of the protection circuit module 120. The third lead plate 160 includes a first region 161, a second region 162, and a third region 163 respectively corresponding to the regions 151, 152, and 153 of the second lead plate 150.

The upper cover 170 is connected to an upper part of the bare cell 110 and has an inner space to receive and house the protection circuit module 120. The upper cover 170 includes a cover plate 171, and sidewalls 173 and 174 extending from the cover plate 171 toward the protection circuit module 120.

The cover plate 171 may have a substantially similar shape to the upper surface 110a of the bare cell 110. An inner surface of the cover plate 171 faces the upper surface 121b of the circuit board 121. The cover plate 171 includes a through hole 172 on a region generally corresponding to the terminal 122. Since the terminal 122 is exposed to the outside through the through hole 172, the secondary battery 100 of the embodiment may be electrically connected with an external electronic appliance.

The sidewalls are divided into end parts 173 located at both longitudinal ends of the upper cover 170 and linking parts 174 linking the end parts 173. The end parts 173 adjoin regions of the upper surface 110a of the bare cell 110 corresponding to the short side surfaces 110b and 110c, while supporting the cover plate 171. The linking parts 174 extend a greater distance than the end parts 173 down toward the protection circuit module 120. Part of the linking parts 174 covering upper parts of the long side surfaces 110d and 110e of the bare cell 110 are enclosed by the label 190 that will be described hereinafter.

The lower cover 180 is connected to a lower part of the bare cell 110. The lower cover 180 may include a bottom plate 181, and extension parts 182 extending from the bottom plate 181 toward the bare cell 110.

The bottom plate 181 has substantially the same shape to the lower surface 110f of the bare cell 110 and may be attached to the lower surface 110f by an adhesive member 183.

In addition, the extension parts 182 cover lower parts of the long side surfaces 110d and 110e of the bare cell 110. The extension parts 182 are enclosed by the label 190.

The label 190 is attached to enclose the sidewalls 110b, 110c, 110d, and 110e of the bare cell 110. The label 190 partially covers the linking parts 174 of the upper cover 170 and the extension parts 182 of the lower cover 180.

According to the above, the first lead plate 140 located at the lower part of the protection circuit module 120 and connected with the electrode terminal 111 of the bare cell 110 is extended and connected to the lower surface of the temperature sensitive device 130. Accordingly, heat from the bare cell 110 may be transferred to the temperature sensitive device 130 without significant loss. Therefore, the temperature sensitive device 130 is capable of sensitively reacting to the temperature of the bare cell 110 to secure the operational reliability and the product stability.

Although exemplary embodiments of the secondary battery according to the present invention have been described herein, this is only by way of example. Therefore, the scope of the invention is not limited to the embodiments. Rather, it will be understood by those skilled in the art that various changes in form and details may be made without departing from the spirit and scope as defined by the appended claims.

[Description of the Reference Numerals]

| | |
|---|---|
| 100; secondary battery | 110; bare cell |
| 120; protection circuit module | |
| 130; positive temperature coefficient (temperature sensitive device) | |
| 140; first lead plate | 141; first region |
| 142; second region | 143; third region |
| 150; second lead plate | 160; third lead plate |
| 170; upper cover | 180; lower cover |
| 190; label | |

What is claimed is:

1. A secondary battery comprising:
a bare cell comprising a can, a cap plate on the can, and an electrode terminal protruding from the cap plate;
a protection circuit module on the cap plate and wherein the cap plate is in direct contact with the bare cell, the protection circuit module comprising:
a circuit board;
a temperature sensitive device coupled to the circuit board; and
a first lead plate having a one-piece conctruction being electrically coupled to the electrode terminal, the first lead plate having a first planar portion terminating in a first end, wherein an entirety of the first end directly contacts the circuit board a second planar portion terminating in a second end, wherein an entirety of the second end is directly coupled to the temperature sensitive device, and a perpendicular connection portion between the first planar portion and the second planar portion.

2. The secondary battery of claim 1, where a length of the connecting portion is substantially equal to a height of the temperature sensitive device.

3. The secondary battery of claim 1, wherein the circuit board is spaced from the cap plate.

4. The secondary battery of claim 1, wherein the protection circuit module further comprises a second lead plate coupled to the circuit board and to the cap plate.

5. The secondary battery of claim 4, wherein the protection circuit module further comprises a third lead plate coupled to the circuit board and to the cap plate.

6. The secondary battery of claim 5, wherein the second lead plate and the third lead plate each comprise a first planar portion, a second planar portion and a connecting portion between the first planar portion and the second planar portion.

7. The secondary battery of claim 6, wherein the first planar portion of the second lead plate and the third lead plate contacts the circuit board and wherein the second planar portion of the second lead plate and the third lead plate contacts the cap plate.

8. The secondary battery of claim 1, wherein the first lead plate is coupled to the temperature sensitive device by a weld or by a thermally conductive adhesive.

9. The secondary battery of claim 1, wherein the first lead plate comprises metal.

10. The secondary battery of claim 1, wherein the protection circuit module further comprises a field effect transistor on the circuit board.

11. The secondary battery of claim 10, wherein the field effect transistor is spaced from the cap plate.

12. The secondary battery of claim 1, wherein the cap plate has an opening that is generally aligned with the first lead plate.

13. The secondary battery of claim 12, wherein the first lead plate and the electrode terminal are welded at a region generally corresponding to the opening.

14. The secondary battery of claim 1, wherein the temperature sensitive device comprises a chip positive temperature coefficient thermistor.

15. The secondary battery of claim 1, wherein the temperature sensitive device comprises a positive temperature coefficient device, a thermal fuse, or a negative temperature coefficient device.

* * * * *